(12) United States Patent
Hoke

(10) Patent No.: US 6,934,438 B2
(45) Date of Patent: Aug. 23, 2005

(54) CLOSED LOOP ALIGNMENT SYSTEM FOR FIBER OPTIC CROSS-CONNECT SWITCHES

(75) Inventor: Charles D. Hoke, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/409,271

(22) Filed: Apr. 7, 2003

(65) Prior Publication Data

US 2004/0202407 A1 Oct. 14, 2004

(51) Int. Cl.[7] ............................................. G02B 6/26
(52) U.S. Cl. .............................. 385/16; 385/18; 385/19
(58) Field of Search ................................ 385/16–22, 37

(56) References Cited

U.S. PATENT DOCUMENTS

| | | | |
|---|---|---|---|
| 6,300,665 B1 | 10/2001 | Peeters et al. | |
| 6,483,962 B1 | 11/2002 | Novotny | |
| 6,567,574 B1 * | 5/2003 | Ma et al. | 385/16 |
| 6,591,029 B1 * | 7/2003 | Lin et al. | 385/17 |
| 6,760,505 B1 * | 7/2004 | Street et al. | 385/18 |
| 2002/0076136 A1 | 6/2002 | Ducellier et al. | |
| 2002/0181848 A1 | 12/2002 | Lemoff et al. | |
| 2004/0057658 A1 * | 3/2004 | Chu et al. | 385/18 |

FOREIGN PATENT DOCUMENTS

WO WO 01/93625 A2 12/2001

* cited by examiner

Primary Examiner—Fayez G. Assaf

(57) ABSTRACT

A closed loop alignment system for cross-connect switches in optical telecommunications systems. Arrays of small tiltable mirrors within the switch direct the signal beams between optical fiber arrays connected to the switch. An external alignment system is incorporated into the cross-connect switch and is employed to provide an alignment beam of a wavelength different from the signal beams. Beam splitters such as dichroic mirrors, which pass the signal beams but pass only a portion of the alignment beams, are placed in the beam paths to image the ends of the optical fibers of the arrays. A combined image of the ends of the optical fibers from each array is reflected onto a photodetector array, output signals of which are sent to a feedback control system for comparison of the combined image to a stored tolerance range and consequently moves the tiltable mirrors as necessary for proper alignment.

21 Claims, 7 Drawing Sheets

CLOSED LOOP ALIGNMENT SYSTEM FOR FIBER OPTIC CROSS-CONNECT SWITCHES

BACKGROUND OF THE INVENTION

1. Field of the Invention

The present invention relates to fiber optic, cross-connect switches employing individual tiltable mirrors which direct signal beams within the switches between the desired optical fibers in telecommunications systems, and more specifically to an alignment system for such switches.

2. Discussion of the Related Art

Optical telecommunications systems are increasingly replacing cable and other wire-based electronic telecommunications systems. This is directly related to the speed of light at which data is transmitted through optical fibers, the ability to transmit data in parallel using different wavelengths of light, the ability to simultaneously transmit data in both directions along each optical fiber, and the increased miniaturization and lower cost of the optical components necessary to build optical telecommunications systems.

Optical telecommunications systems typically require switching of the data transmitted by the light from the end of one optical fiber to another which requires mechanical switching of the light path. Advances in miniaturization of optical switching based on micro-electromechanical system (MEMS) mirrors are now making optical communications systems both more economical to build and more reliable in use. Such MEMS mirrors are typically constructed as a two dimensional array of tiltable mirrors as part of an optical cross-connect switch, which mirrors direct light from an emitter end of one optical fiber to a target end of another optical fiber. Each end of an optical fiber can simultaneously be both an emitter end and a target end. The tiltable mirrors can simultaneously rotate about individual "X" and "Y" axes, each tiltable mirror being individually suspended above a base or substrate by a plurality of flexible suspension arms attached to the substrate. The signal beam travels using free-space light transmission between the optical fibers, making numerous configurations and sizes of optical cross-connect switches and systems possible. The tiltable mirrors are tilted by electrostatic, electro-magnetic, piezoelectric, or thermal actuation forces which are induced between the tiltable mirrors and the substrate through a controller. The MEMS mirror arrays may have on the order of 1000×1000 individual mirrors sized with a typical diameter or diagonal in the range of about 300 um to about 1000 um. The tiltable mirrors can be shaped as a circle, ellipse, polygon, or rectangle, and can be planar or curved, with planar being typical due to ease of construction. The signal beam is typically a circular beam. Respective circular collimating lenslets are typically, but optionally, disposed closely adjacent the ends of the optical fibers to focus the signal beams as they exit the emitter ends and enter the target ends thereof.

Other components used in optical telecommunications systems may include beam combiners and beam splitters for multiplexing and demultiplexing optical signal beams having different wavelengths. Such beam combiners and beam splitters typically utilize a dichroic mirror disposed at an angle to the path of the signal beams. The dichroic mirrors function in a known manner, reflecting part or all of a preselected wavelength of light while transmitting the remaining wavelengths, or by transmitting the preselected wavelength of light and reflecting the remaining wavelengths. Therefore, either the preselected wavelength or the other wavelengths of light are passed through the dichroic mirror in a substantially straight path while part or all of the other wavelengths are reflected at a predetermined angle relative to the angle of incidence of the light beam.

Another component used in various arts are charge-coupled device (CCD) cameras which comprise a large number of photosensitive detectors which are grouped, such as in a flat rectilinear array. Each detector includes a photosensitive front and a pair of electrical outputs through which electrons are emitted when light of a predetermined range of wavelengths shines on the photosensitive front. The outputs of the detectors of the CCD camera are input to a processing unit for analysis as needed. CCD cameras are used for various purposes in which the position, intensity, and wavelength of light needs to be recorded as an electrical signal to be analyzed electronically.

SUMMARY OF THE INVENTION

In accordance with the present invention, a closed loop alignment system for fiber optic, cross-connect switches is used in order to ensure that signals are accurately coupled from optical fibers in one array or group to respective optical fibers in a second array or group. The optical fiber arrays may be spaced by any practical distance as the requirements of the cross-connect system may dictate or allow. A visual optical probe or alignment light beam passes through a first beam splitter and is superimposed on the ends of the signal-emitting or signal receiving optical fibers. Using that optical beam, the images of the ends of the signal-emitting optical fibers are then reflected as multiple light beams, through the use of the tiltable mirror arrays (MEMS) of the cross-connect switch, onto the ends of respective signal-receiving fibers, thereby ensuring full signal transfer or coupling between optical fibers at a distance from each other. The fibers in each array may be either signal-emitting or signal receiving, and may be both simultaneously. Dichroic mirrors are preferably employed as the beam splitters to partially reflect and partially pass the visual alignment beams, and to pass substantially all of the signal beams, which have a wavelength different from the visual alignment beams. A detector at the side of the cross-connect switch opposite to the probe beam source is employed to determine beam alignment.

The detector employed to receive the probe beams is an array of a plurality of sensors for detecting light beams which impinge on it, the detector array being disposed in the cross-connect switch adjacent a second beam splitter. A portion of the probe beams of the combined alignment and signal beams passes through the second beam splitter and reflects off the ends of the optical fibers of the second fiber optic array to form an image of the ends of the optical fibers of the first fiber optic array superimposed upon the image of the ends of the optical fibers of the second fiber optic array. The alignment beam carrying the combined probe beam image passes back to the second beam splitter, and a portion of that beam reflects from the second beam splitter onto the detector array as the combined image.

A feedback control system receives output signals from the photosensitive sensors of the detector array. The feedback control system compares the position, size, and shape of the combined image to a stored tolerance range of acceptable relative positions, sizes, and shapes for the combined image. The feedback control system generates and sends corrective feedback signals to mirror drivers as mirror positioning signals to correct for any deviation between the actual position, size, and shape of the combined image and the desired tolerance range of acceptable positions, sizes, and shapes of the images to correctly aim the tiltable mirrors of each mirror arrays. When properly aligned so that the images are coincident, signals are fully coupled between the respective fibers in the optical arrays.

The invention also includes the method of providing closed-loop feedback in fiber optic, cross-connect switches employing the structures described.

BRIEF DESCRIPTION OF THE DRAWING

The objects, features and advantages of the invention will be more clearly perceived from the following detailed description, when read in conjunction with the accompanying drawing, in which.

DETAILED DESCRIPTION OF THE PREFERRED EMBODIMENTS

Figure 1:
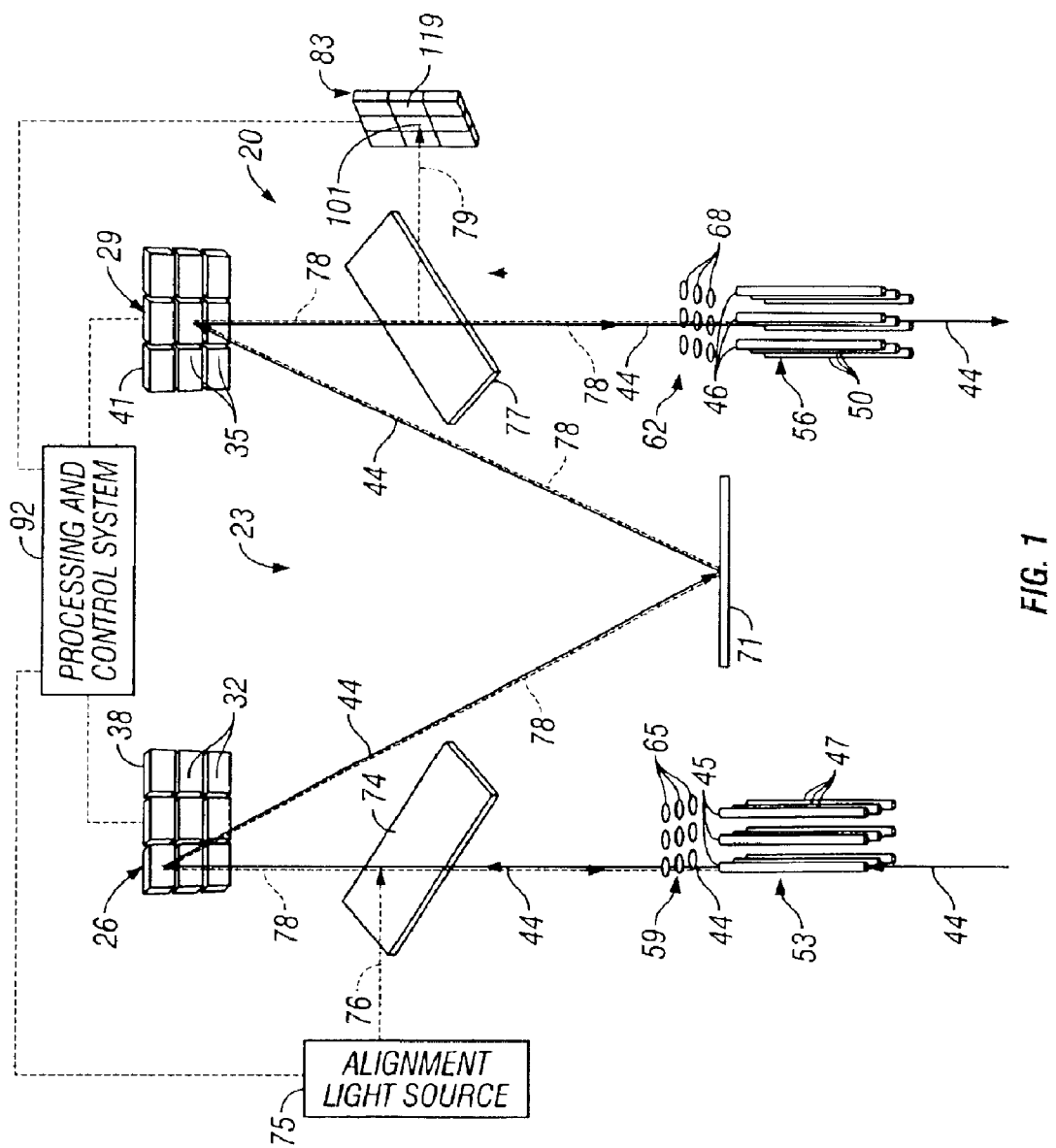
FIG. 1 is a diagrammatic view of a closed-loop alignment system according to an embodiment of the invention as part of a first fiber optic cross-connect switch.

Referring to FIG. 1, there is shown a diagrammatic representation of an exemplary closed-loop alignment system according to an embodiment of the invention, designated generally at 20, functioning with fiber optic cross-connect switch 23.

The basic structure of known cross-connect switch 23 comprises respective first and second two-dimensional MEMS mirror arrays 26 and 29, each of which includes a plurality of respective individually tiltable mirrors 32 and 35 pivotally mounted on respective substrates 38 and 41. Mirrors 32 and 35 are used to direct a plurality of light beams, represented by signal beam 44 of light (only one signal beam 44 being shown for simplicity), emitted through ends 45 and 46 of a selected one of individual optical fibers 47 and 50 of respective first and second two-dimensional fiber optic arrays 53 and 56, to a desired optical fiber 50, 47 of the respective opposing fiber optic array 56, 53. The wavelength range typically used for optical telecommunications is about 1,250 to 1,650 nm, preferably at the infrared range of about 1500 nm. Respective first and second lenslet arrays 59 and 62, each comprising respective individual collimating lenslets 65 and 68 corresponding to a respective individual optical fiber 47 and 50, can be used to focus signal beams 44 out of fiber ends 45 and 46 into the respective optical fiber 47 and 50. Note that the number of operational mirrors 32 and 35, first and second optical fibers 47 and 50, and lenslets 65 and 68, are equal. Lenslets 65 and 68 are optional in this system. Fixed mirror 71 is disposed opposite mirrors 32 and 35 between fiber optic arrays 53 and 56. While such cross-connect switches 23, as described thus far, are typically calibrated for temperature, there is no way to adjust them in operation, such as by providing feedback as to the accuracy of the positioning of mirror arrays 26 and 29 relative to optical fibers 47 and 50.

Closed-loop alignment system 20 of an embodiment of the invention, as shown in FIG. 1, is employed to align the signal beams from the ends of fibers 47 and 50 to the ends of the fibers in the opposite array of optical fibers. The alignment system of the invention injects a visible wavelength alignment beam directly into the signal beams and detects visible wavelength combined fiber-ends images to determine the extent of alignment of the signals between the optical fiber arrays. This alignment system arrangement, by being coincident with the signal beams, compensates for time and temperature drift which can occur in such cross-connect switches.

The alignment system of FIG. 1 includes respective first and second selectively semi-transparent optical components or beam splitters 74 and 77 which are disposed, respectively, between first fiber optic array 53 and first mirror array 26, and between second fiber optic array 56 and second mirror array 29. The beam splitters are preferably dichroic mirrors but other functionally equivalent elements, such as diffraction gratings, could be used. Light source 75 emits a probe or alignment beam 76 having a wavelength differing from the signal wavelength by at least 50 nm. The wavelength of beam 76 can range from about 400 nm to about 900 nm, and for practical purposes is preferably about 800 nm. Because of the wavelength difference, this visible light beam does not interfere with signal beams 44 when they coincide. Light beam 76 intersects with or impinges on first dichroic mirror 74 and at least a portion of this alignment beam is reflected onto fiber ends 45. The images of the ends of fibers 47 form a plurality of light beams 78 which are reflected back to and partially through mirror 74. These alignment light beams are coincident with signal beams 44, which originate externally to fibers 47 and pass therethrough, and generally pass unimpeded through mirror 74. Dichroic mirror 77 at the output of the alignment system functions in a similar manner, as is explained below.

Dichroic mirrors 74 and 77 are designed with a known layering scheme (not shown) wherein light at certain predetermined wavelengths (for example, signal beams 44) substantially pass therethrough without significant absorption or reflection. However, about fifty percent of light at other wavelengths, such as alignment beam 76, at an incident angle of, for example, about forty-five degrees, is reflected at a complementary forty-five degree angle (ninety-degree included angle) and the remaining fifty percent passes therethrough. Therefore, first dichroic mirror 74 acts to pass fifty percent of alignment beam 76 therethrough, which is lost, and fifty percent is reflected to optical fibers 47. An alignment beam 78 reflects off end 45 of an optical fiber 47 and retraces its path as an image thereof to first dichroic mirror 74, again with fifty percent lost (being reflected back toward light source 75), and fifty percent passing therethrough to mirror array 26. Alignment beam 78 is reflected from its respective tiltable mirror 32 at the desired angle as controlled by processing and control system 92, off fixed mirror 71, and off a tiltable mirror 35 of second mirror array 29, which is also controlled by processing and control system 92, to second dichroic mirror 77. Second dichroic mirror 77 acts to reflect fifty percent of alignment beam 78, which is lost, and pass fifty percent therethrough to optical fibers 50. An alignment beam 78 reflects offend 46 of an optical fiber 50 and retraces its path as a combined image of ends 45 and 46 of an optical fibers 47 and 50 to second dichroic mirror 77, with fifty percent passing therethrough, which is lost, and fifty percent being reflected therefrom as beam 79 onto detector array 83 as combined image 101. Note that a signal beam 44 may travel both from fiber optic array 53 to 56, and from fiber optic array 56 to 53, simultaneously in both directions in all of the optical fibers since alignment system 20 positions the tiltable mirrors 32 and 35 of mirror arrays 26 and 29 the same, regardless of the direction of travel of signal beam 44. The purpose of the alignment is to have near complete overlap of the images of the ends 45, 46 of fibers 47, 50, thereby ensuring optimal coupling of optical signals between the fibers.

Figure 2:
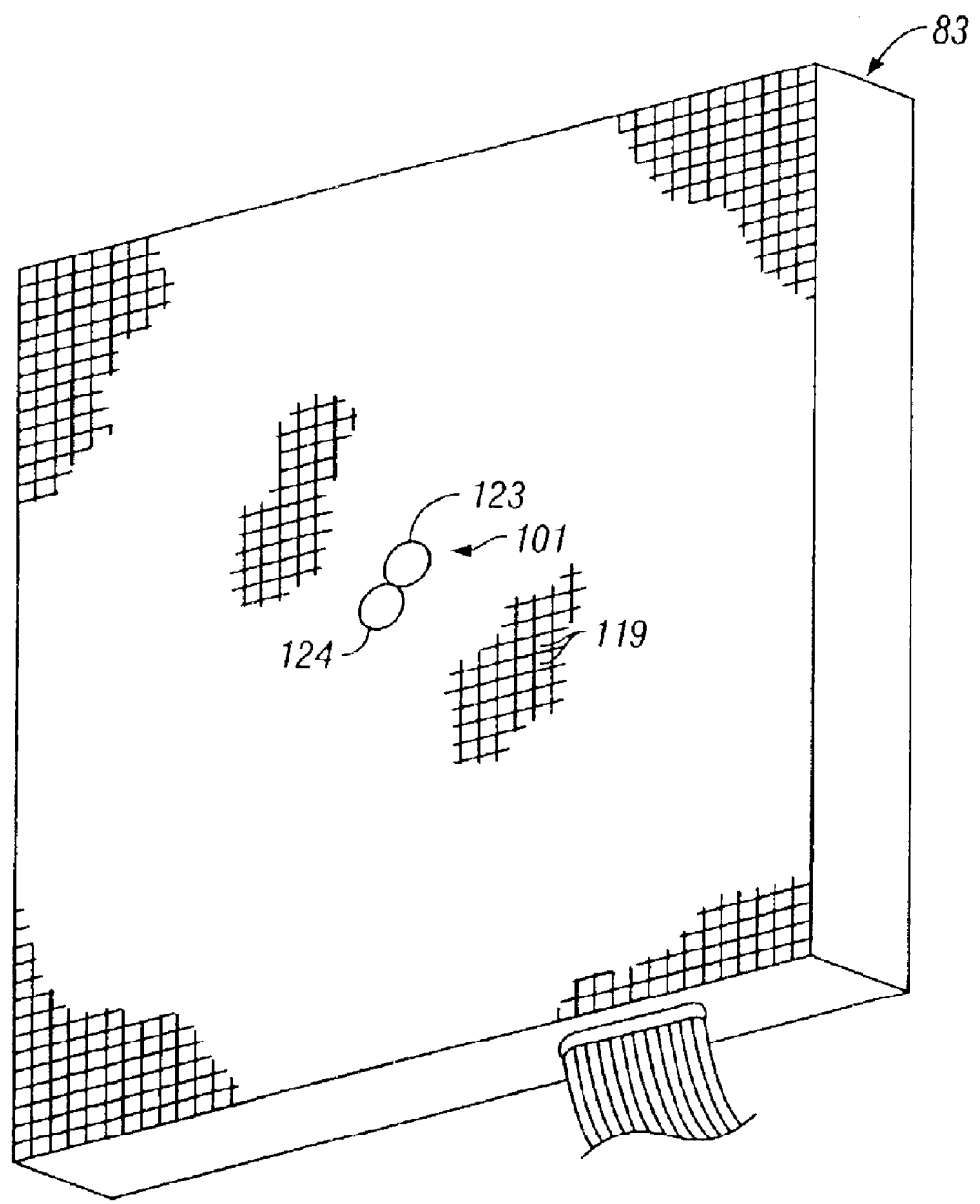
FIG. 2 is a diagrammatic view on an enlarged scale of a combined image on a detector array of the system of FIG. 1.
Figure 3:
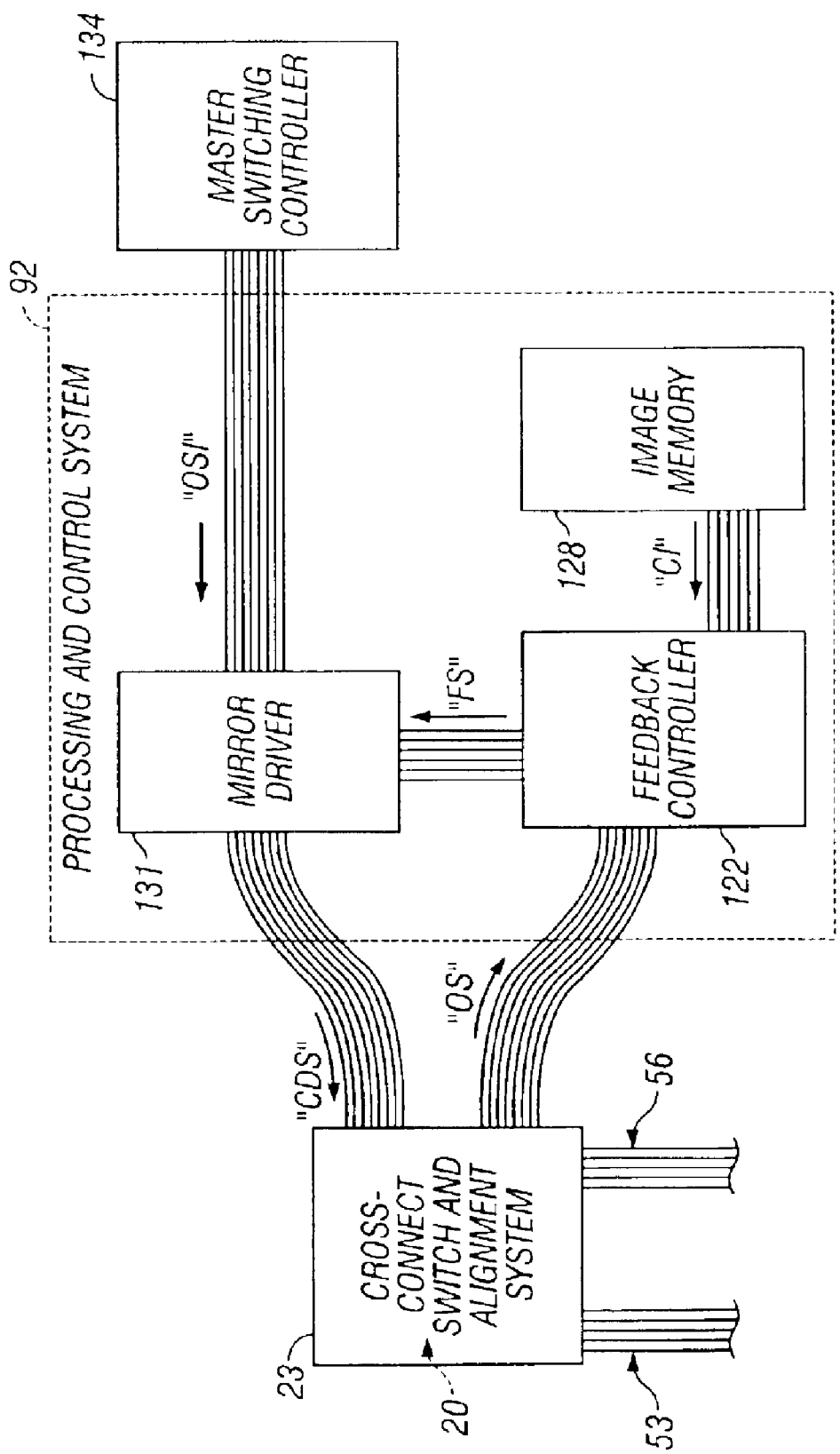
FIG. 3 is a block diagram of exemplary electronics for the system of FIG. 1.

Referring to FIGS. 2 and 3, detector array 83 may comprise an array of relatively inexpensive silicon detectors. One example is a charge-coupled device (CCD) camera having a plurality of individual photosensitive detectors or sensors 119 such as in a 3000×3000 or a 5000×5000 array. An output signal (OS) of each individual photosensitive sensor 119 is input to processing and control system 92, which includes feedback controller 122 that compares the relative position, size, and shape of combined image 101, each being comprised of an image 123 of end 45 of one optical fiber 47, and an image 124 of end 46 of one optical fiber 50, to an acceptable relative position, size, and shape of a combined image (CI) stored in image memory 128. If an image 101 is out of tolerance in position, size, or shape, mirror position correction information is developed by feedback controller 122 and an appropriate feedback signal (FS) is sent to mirror driver 131 which integrates the feedback signal FS with newly arriving optical switching information (OSI) being communicated to mirror driver 131 from master switching controller 134. Appropriately corrected drive signals (CDS) are sent from mirror driver 131 to first or second mirror arrays 26 and 29, or both, to properly position respective individual tiltable mirrors 32 and 35 based on the feedback signal FS.

Figure 4:
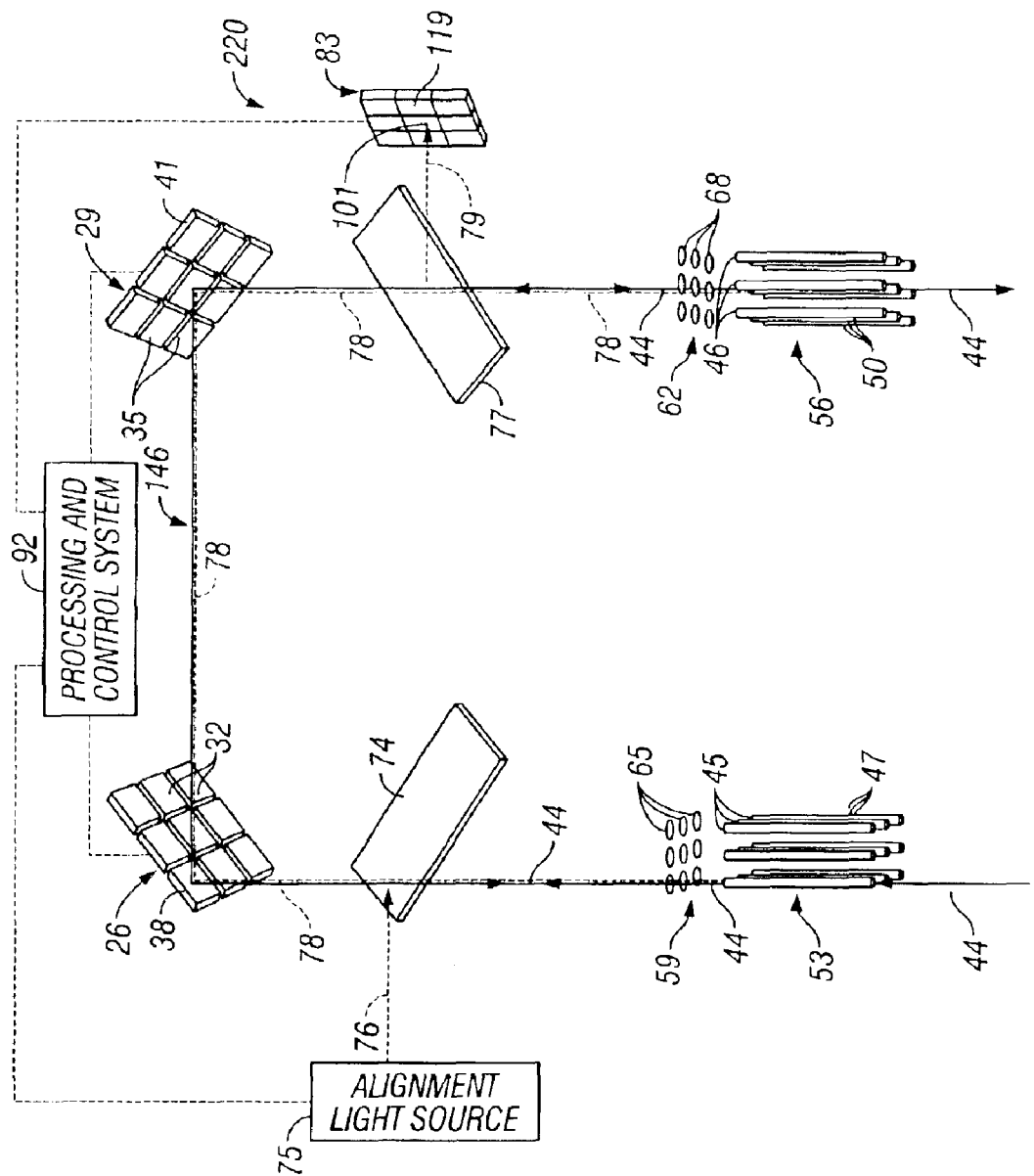
FIG. 4 is a diagrammatic view of a second embodiment of a closed-loop alignment system in accordance with the invention, the alignment system functioning with a second fiber optic cross-connect switch embodiment.

Referring to FIG. 4, therein is shown a diagrammatic representation of closed loop alignment system 220 in accordance with the invention, functioning with second fiber optic cross-connect switch 146.

Cross-connect switch 146 comprises mirror arrays 26 and 29, but note that there is no fixed mirror 71 disposed opposite the mirrors 32 and 35 between the fiber optic arrays 53 and 56. In this switch embodiment, the respective mirror arrays 26 and 29 are tilted inwardly at about a forty-five degree angle to allow direct reflection of signal beams 44 emitted through respective optical fibers 47 and 50 directly from respective mirrors 32 and 35 to the other thereof, and to the desired optical fiber 47 and 50 of the respective opposing fiber optic array 53 and 56. The respective, optional, first and second lenslet arrays 59 and 62, having respective individual collimating lenslets 65 and 68, function in the same manner as in the earlier embodiments.

Closed-loop alignment system 220 includes dichroic mirrors 74 and 77 which are disposed, respectively, between first fiber optic array 53 and first mirror array 26, and between second fiber optic array 56 and second mirror array 29. Light source 75 emits the visible wavelength alignment beam 76 which impinges on the first dichroic mirror as previously described with respect to the FIG. 1 embodiment. Except for intermediate fixed mirror 71, the FIG. 4 embodiment operates in the same manner as the FIGS. 1–3 embodiment. Alignment beams 78 are employed to align respective signal beams 44 without wavelength interference.

Figure 5:
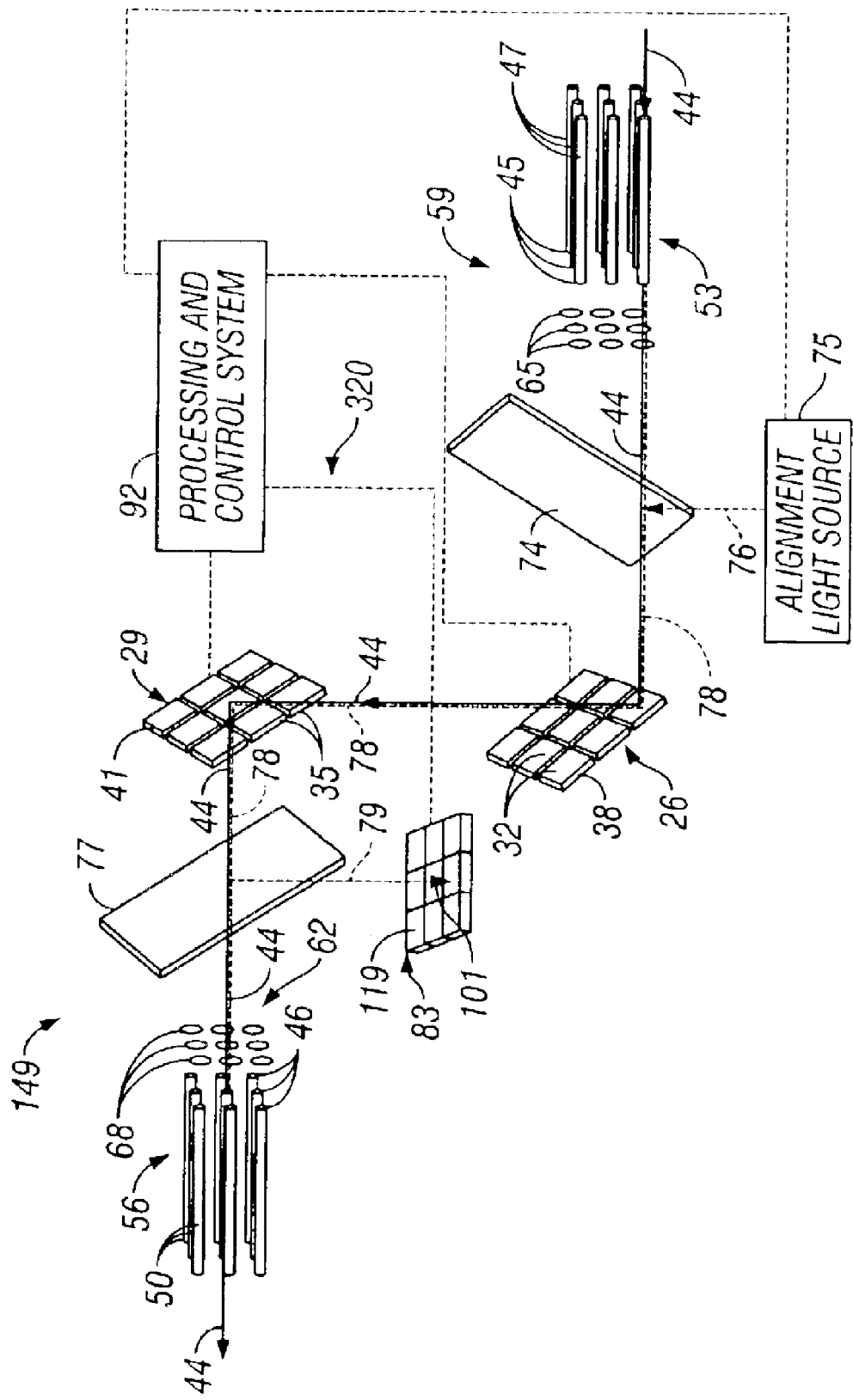
FIG. 5 is a diagrammatic view of a third embodiment of a closed-loop alignment system in accordance with the invention as part of a third fiber optic cross-connect switch embodiment.

Referring to FIG. 5, therein is shown a diagrammatic representation of closed loop alignment system 320, functioning with third fiber optic cross-connect switch 149.

As with the previously described embodiments, cross-connect switch 149 comprises the mirror arrays 26 and 29 with the respective tiltable mirrors 32 and 35. Mirrors 32 and 35 are used to direct the signal beams 44 emitted through the optical fibers 47 and 50 of the respective fiber optic arrays 53 and 56 to the desired optical fiber 47 and 50 of the opposing fiber optic array 53 and 56. Lenslet arrays 59 and 62 function in the same manner as in the previously described embodiments. The FIG. 5 embodiment is a different arrangement of the same elements as in FIG. 4, which elements function in the same manner as before.

Figure 6:
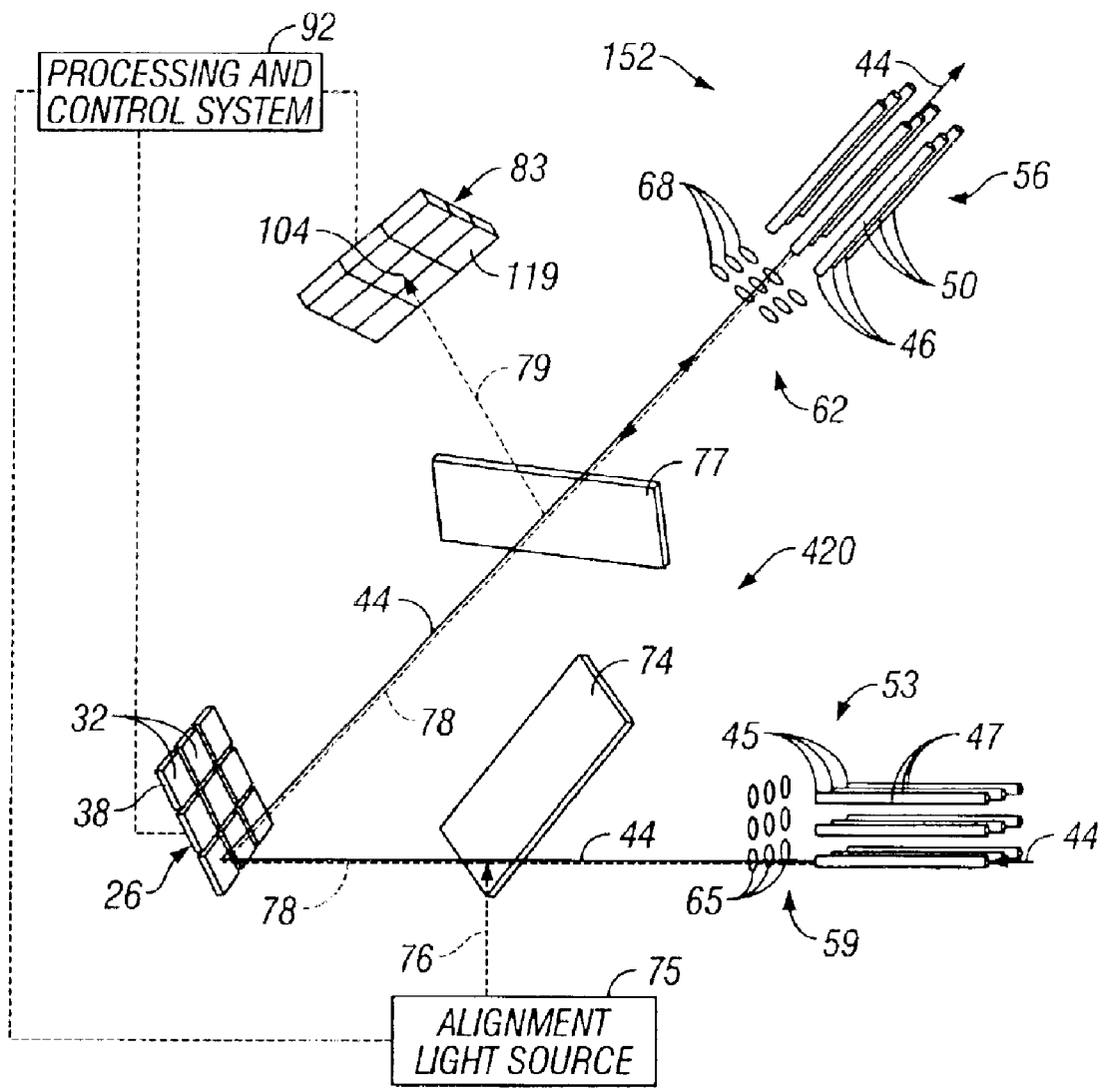
FIG. 6 is a diagrammatic view of a fourth embodiment of a closed-loop alignment system in accordance with the invention, the alignment system functioning with a fourth fiber optic cross-connect switch embodiment.

Referring to FIG. 6, therein is shown a diagrammatic representation of closed loop alignment system 420, functioning with fourth fiber optic cross-connect switch 152.

Cross-connect switch 152 differs from the previously described embodiments in that it comprises mirror array 26 with tiltable mirrors 32 but does not include the second tiltable mirror array 29. This is a more basic cross-connect switch embodiment. Mirrors 32 are used to direct the signal beams 44 emitted through optical fibers 47 and 50 of fiber optic arrays 53 and 56 to the desired optical fiber 47 and 50 of the opposing fiber optic array 53 and 56. The respective, optional, first and second lenslet arrays 59 and 62, having respective individual collimating lenslets 65 and 68, function in the same manner as in the previously described embodiments. Note that this embodiment shows that the alignment system of this invention can function with an optical cross-connect switch having a single mirror array. It also reveals that the relative angles of the components are quite flexible, it only being necessary to direct signal beams from one fiber array to another. The alignment apparatus can be arranged to conform to any cross-connect switch configuration.

This embodiment of closed loop alignment system 420 includes dichroic mirrors 74 and 77 which are disposed, respectively, between first fiber optic array 53 and mirror array 26, and between second fiber optic array 56 and mirror array 26. Light source 75 emits the alignment beam 76, as before, which impinges on first dichroic mirror 74. Light detector array 83 is affixed adjacent second dichroic mirror 77 to receive reflected light therefrom. As before, signal beams between optical fibers 47 and 50 are aligned when the optical images of ends 45 and 46 of the respective optical fibers are aligned, as detected by detectors 119 on array 83.

Figure 7:
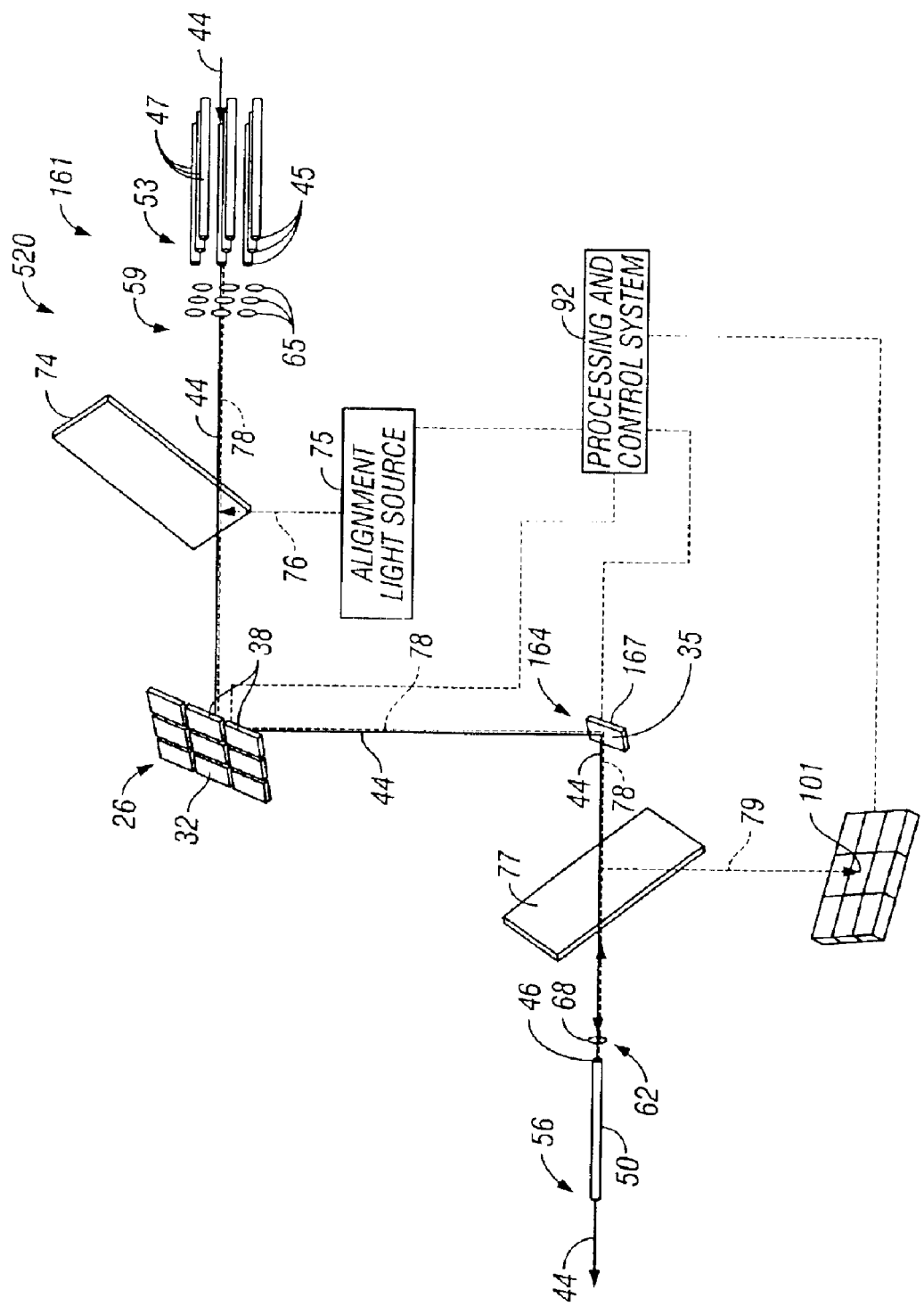
FIG. 7 is a diagrammatic view of a fifth embodiment of a closed-loop alignment system in accordance with the invention as part of a fifth fiber optic cross-connect switch embodiment.

Referring to FIG. 7, therein is shown a diagrammatic representation of closed loop alignment system 520, functioning with fifth fiber optic cross-connect switch 161.

Cross-connect switch 161 comprises mirror array 26 and mirror array 164, comprising single mirror element 35 pivotally mounted on substrate 167. Mirrors 32 and 35 are used to direct signal beams 44, emitted through optical fibers 47 of fiber optic array 53, and optical fiber array 56, containing single second optical fiber 50, to a desired optical fiber 47 and 50 of the respective opposing fiber optic array 56 and single optical fiber 50. Respective, optional, lenslet arrays 59 and 62 function in the same manner as in the previously described embodiments.

Closed loop alignment system 520 includes dichroic mirrors 74 and 77 which are disposed, respectively, between first fiber optic array 53 and first mirror array 26, and between second fiber optic array 56 (optical fiber 50) and second mirror array 164 (mirror 35). Light source 75 emits visual alignment beam 76 which impinges on first dichroic mirror 74. Light detector array 83 is affixed adjacent second dichroic mirror 77 to receive reflected light therefrom. The optical alignment system operates in the same manner as has been previously described with respect to other embodiments of the cross-connect switch. The primary difference is that one optical fiber array consists of a plurality of fibers and the other array is a single fiber.

In this embodiment, all signal beams from optical fiber array 53 are aligned with single fiber 50. One purpose for this optical switch is to mulitplex a selectable subset of different wavelength signals from different optical fibers 47 into single fiber 50.

It should be understood that the cross-connect switch can function as a demultiplexer where the optical signals enter through the single optical fiber and are dispersed as multiple signals through the array of multiple fibers. Appropriate changes as to the relative locations of the alignment beam source and the detector array can be made as needed.

It can be seen that the alignment system of the invention is external to and can be adapted to any optical fiber cross-connect switch, and any practical combination of angles can be accommodated. It is even possible to employ the present alignment system with a cross-connect switch having the input and the output optical fibers bundled together in adjacent arrays. The ends of the fibers could all be oriented in the same direction or they could be oriented so that the coupling ends of the input and output fibers are 1800 apart, with the fibers all in parallel.

For purposes of providing practical examples, probe or alignment beam source 75 can be any of several different types. It could be an arc lamp, a laser diode, an LED, or an incandescent lamp, among others. Where there are unwanted wavelengths a filter can be employed at the output of the light source. Beam 76 is preferably collimated. It could be a coherent light beam, but that is not necessary.

The wavelength of the probe beam should be matched with the most efficient detection wavelength of detector 83. Silicon sensors are preferred because they are effective and inexpensive, and a light beam at about 800 nm is easily detected by them. In reality it is envisioned that the probe beam can range in wavelength from the visible to the near-infrared.

With the losses created in the alignment beam by the beam splitters, only about 6% of the intensity of the original beam arrives at detector 83. This does not matter, as long as there is sufficient light to accomplish the alignment purpose. Because of their construction, the beam splitters pass the signal beams with only nominal or insignificant losses in intensity.

In any or all of the embodiments shown and described, processing and control system 92 can be any suitable device such as a microcomputer or a PC, among others. It need only be able to accomplish the functions described and no specific device or element is necessary for this invention.

Whereas this invention is here illustrated and described with reference to embodiments thereof presently contemplated as the best mode of carrying out the invention, in actual practice it is to be understood that various changes may be made in adapting the invention to different embodiments without departing from the broader inventive concepts disclosed herein and comprehended by the claims that follow, and their equivalents.

What is claimed is:

1. In an optical cross-connect switch coupling optical signals of a first set of wavelengths from the ends of optical fibers in a first fiber optic array to the ends of optical fibers in an array second fiber optic array, the cross-connect switch having at least one first mirror array which comprises at least one individually controllable, tiltable mirror positioned to direct the signal beams emitted from the end of one optical fiber in one array to the end of another optical fiber in the other array, an alignment system comprising:

a source of an alignment light beam having a second wavelength different from the first set of wavelengths;

a detector array having output signals;

a first selectively semi-transparent optical component configured and positioned to inject the alignment light beam into the signal beams; and a second selectively semi-transparent optical component configured and positioned to reflect the combined images of the ends of the fibers in the first fiber optic array superimposed on the ends of the fibers in die second fiber optic array onto said detector array, the output signals of said detector array being indicative of the degree of overlap coincidence of the images of the ends of the fibers from both the first and second fiber optic arrays.

2. The alignment system recited in claim 1, and further comprising a processing and control system coupled to the mirror controls in the at least one first mirror array, said processing and control system providing signals to individually move the mirrors an the at least one first mirror array in response to the output signals from said detector array to maintain coincidence of the images and thereby alignment of the signals between respective fibers in the first and second fiber optic arrays.

3. The alignment system recited in claim 2, wherein said detector array comprises a charge-coupled device having a plurality of detector elements, each having an output signal coupled to said processing and control system, said processing and control system comprising:

an image memory storing acceptable relative positions, sizes, and shapes for the combined images;

a feedback controller which compares the relative positions, sizes, and shapes of the combined images to the acceptable combined images in said image memory, said feedback controller having output control signals; and a mirror driver which individually positions the mirrors in said at least one first mirror array pursuant to control signals from said feedback controller.

4. The alignment system recited in claim 1, wherein said first and second selectively semi-transparent optical components each comprise a dichroic mirror.

5. The alignment system recited in claim 1, wherein said first and second selectively semi-transparent optical components each comprise a diffraction grating.

6. The alignment system recited in claim 1, wherein said first and second selectively semi-transparent optical components are selected from the group consisting of a dichroic mirror and a diffraction grating.

7. The alignment system recited in claim 1, wherein said detector array comprises a plurality of silicon detector elements.

8. The alignment system recited in claim 1, wherein said detector array comprises a charge-coupled device camera.

9. The alignment system recited in claim 1, wherein said alignment light beam source comprises a source of light in the visible wavelength range.

10. The alignment system recited in claim 1, wherein said selectively semi-transparent optical components are transparent to the first set of wavelengths and semi-transparent to the second wavelength.

11. A method of aligning optical signal beams between the ends of fibers in first and second optical fiber arrays in a fiber optic, cross-connect switch, the optical signals being of a first set of wavelengths, the switch having at least a first mirror array comprising at least one individually controllable, tiltable mirror positioned to direct the signal beams emitted from the end of one optical fiber in one optical fiber array to the end of another optical fiber in the other optical fiber array, the method comprising:

injecting into the signal beams an alignment light beam having a second wavelength different from the first set of wavelengths;

creating combined images with the alignment light beam of the ends of the optical fibers in the first and second optical fiber arrays;

reflecting the combined images of the ends of the fibers in the first and second optical fiber arrays onto a detector array; and providing output signals from the detector array, which output signals are indicative of the degree of overlap coincidence of the images of the ends of the fibers from both the first and second optical fiber arrays.

12. The method recited in claim 11, and further comprising comparing the output signals from the detector array with stored signals corresponding to acceptable relative positions, sizes, and shapes for the combined images.

13. The method recited in claim 12, and further comprising adjusting the controllable, tiltable mirrors in the first mirror array for substantial coincidence of the positions, sizes, and shapes of the images of the ends of the optical fibers of the first optical fiber array with the images of the ends of the optical fibers in the second optical fiber array.

14. The method recited in claim 11, wherein a source of visible light and a first selectively semi-transparent optical element are employed to inject the alignment beam into the cross-connect switch.

15. The method recited in claim 14, wherein a second selectively semi-transparent optical element is employed to reflect the combined images of the ends of the fibers from both the first and second optical fiber arrays onto the detector array.

16. The method recited in claim 15, wherein the selectively semi-transparent optical elements are transparent to the first set of wavelengths and are semi-transparent to the second wavelength.

17. In a fiber optic, cross-connect switch coupling optical signals of a first set of wavelengths from the ends of optical fibers in a first fiber optic array to the ends of optical fibers in an array second fiber optic array, the cross-connect switch having at least a first minor array which comprises at least one individually controllable, tiltable mirror positioned to direct the signal beams emitted from the end of one optical fiber in one fiber optic array to the end of another optical fiber in the other fiber optic array, a closed loop alignment system comprising:

a source of an alignment light beam having a second wavelength different from the first set of wavelengths:

a detector array having output signals;

means for injecting the alignment beam into the signal beams; and means for directing the reflected combination of the images of the ends of the optical fibers in the first and second fiber optic arrays onto said detector array, the output signals of said detector array being indicative of the relative alignment of the images of the ends of the fibers from both the first and second fiber optic arrays.

18. The alignment system recited in claim 17, and further comprising processing and control means receiving the output signals from said detector array, said processing and control means being coupled to the mirror controls in the at least a first mirror array and providing signals to move individual ones of the tiltable mirrors in said at least a first mirror array to maintain coincidence of the images of the ends of the optical fibers in the first fiber optic arrays.

19. The alignment system recited in claim 17, wherein said injecting and directing means comprise selectively semi-transparent optical components.

20. The alignment system recited in claim 19, wherein said selectively semi-transparent optical components comprise dichroic mirrors.

21. The alignment system recited in claim 17, wherein said detector means comprises a charge-coupled device camera.

* * * * *